(12) United States Patent
Vo et al.

(10) Patent No.: US 10,031,354 B2
(45) Date of Patent: Jul. 24, 2018

(54) ACTIVE-CONTROL OPTICAL RESONATOR

(71) Applicant: Hewlett Packard Enterprise Development LP, Houston, TX (US)

(72) Inventors: Sonny Vo, Palo Alto, CA (US); Zhihong Huang, Palo Alto, CA (US); Chin-Hui Chen, Palo Alto, CA (US); Jason Scott Pelc, Palo Alto, CA (US); Marco Fiorentino, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/109,863

(22) PCT Filed: Jan. 31, 2014

(86) PCT No.: PCT/US2014/014050
§ 371 (c)(1),
(2) Date: Jul. 6, 2016

(87) PCT Pub. No.: WO2015/116143
PCT Pub. Date: Aug. 6, 2015

(65) Prior Publication Data
US 2016/0327818 A1 Nov. 10, 2016

(51) Int. Cl.
*G02F 1/25* (2006.01)
*G02F 1/025* (2006.01)
*G02B 6/12* (2006.01)
*G02B 6/35* (2006.01)

(52) U.S. Cl.
CPC ......... *G02F 1/025* (2013.01); *G02B 6/12007* (2013.01); *G02B 6/357* (2013.01); *G02B 6/3536* (2013.01); *G02F 2203/15* (2013.01); *G02F 2203/58* (2013.01)

(58) Field of Classification Search
CPC .................................................. G02B 6/12007
See application file for complete search history.

(56) References Cited

U.S. PATENT DOCUMENTS

| 5,091,983 A | 2/1992 | Lukosz |
| 7,068,862 B2 | 6/2006 | Lim et al. |
| 8,258,893 B2 | 9/2012 | Quevy et al. |

(Continued)

OTHER PUBLICATIONS

Abdulla, S. M. C., et al. Tuning a Racetrack Ring Resonator by an Integrated Dielectric MEMS Cantilever, Jul. 20, 2011, Optics Express, vol. 19, No. 17, pp. 15864-15878.

(Continued)

*Primary Examiner* — Sung Pak
*Assistant Examiner* — Hoang Tran
(74) *Attorney, Agent, or Firm* — Tong, Rea, Bentley & Kim, LLC

(57) ABSTRACT

An active-control optical resonator includes an oxide layer; a ring resonator arranged in a loop and positioned on the oxide layer; a tangential optical waveguide optically coupled to the ring resonator; a translatable body configured to selectively move into an evanescent field region of the ring resonator; a first electrode positioned on the translatable body, the first electrode comprising indium tin oxide; and a second electrode positioned between the oxide layer and the ring resonator.

19 Claims, 8 Drawing Sheets

(56) References Cited

U.S. PATENT DOCUMENTS

| | | | |
|---|---|---|---|
| 8,542,960 B2 * | 9/2013 | Fattal | G02B 6/12007 385/14 |
| 2004/0022474 A1 | 2/2004 | Lim et al. | |
| 2004/0120638 A1 * | 6/2004 | Frick | B82Y 20/00 385/27 |
| 2005/0271324 A1 * | 12/2005 | Nielson | G02B 6/12007 385/39 |
| 2006/0067651 A1 * | 3/2006 | Chui | G02B 26/001 385/147 |
| 2009/0116788 A1 | 5/2009 | Rakich et al. | |
| 2009/0238515 A1 * | 9/2009 | Fattal | G02B 6/12007 385/30 |
| 2013/0083327 A1 | 4/2013 | Khalil et al. | |

OTHER PUBLICATIONS

Small, J., et al., A Tunable Miniaturized RF MEMS Resonator With Simultaneous High Q (500-735) and Fast Response Speed (<10-60 us), Apr. 1, 2013, Journal of Microelectromechanical Systems, vol. 22, No. 2, pp. 395-405.

* cited by examiner

800

Selectively altering a resonant frequency of an optical resonator by selectively positioning a translatable body within an evanescent field region of the optical resonator

ACTIVE-CONTROL OPTICAL RESONATOR

BACKGROUND

Light beams or optical signals are frequently used to transmit digital data, for example, in fiber optic systems for long-distance telephony and internet communication. Additionally, much research has been done regarding the use of optical signals to transmit data between electronic components on circuit boards.

Consequently, optical technology plays a significant role in modern telecommunications and data communication. Examples of optical components used in such systems include optical or light sources such as light emitting diodes and lasers, waveguides, fiber optics, lenses and other optics, photo-detectors and other optical sensors, optically-sensitive semiconductors, optical modulators, and others.

BRIEF DESCRIPTION OF THE DRAWINGS

The accompanying drawings illustrate various examples of the principles described herein and are a part of the specification. The illustrated examples are merely examples and do not limit the scope of the claims.

FIG. 8 is a flowchart of a method of operating an active-control optical resonator according to principles described herein.

Throughout the drawings, identical reference numbers designate similar, but not necessarily identical, elements.

DETAILED DESCRIPTION

Figure 1:
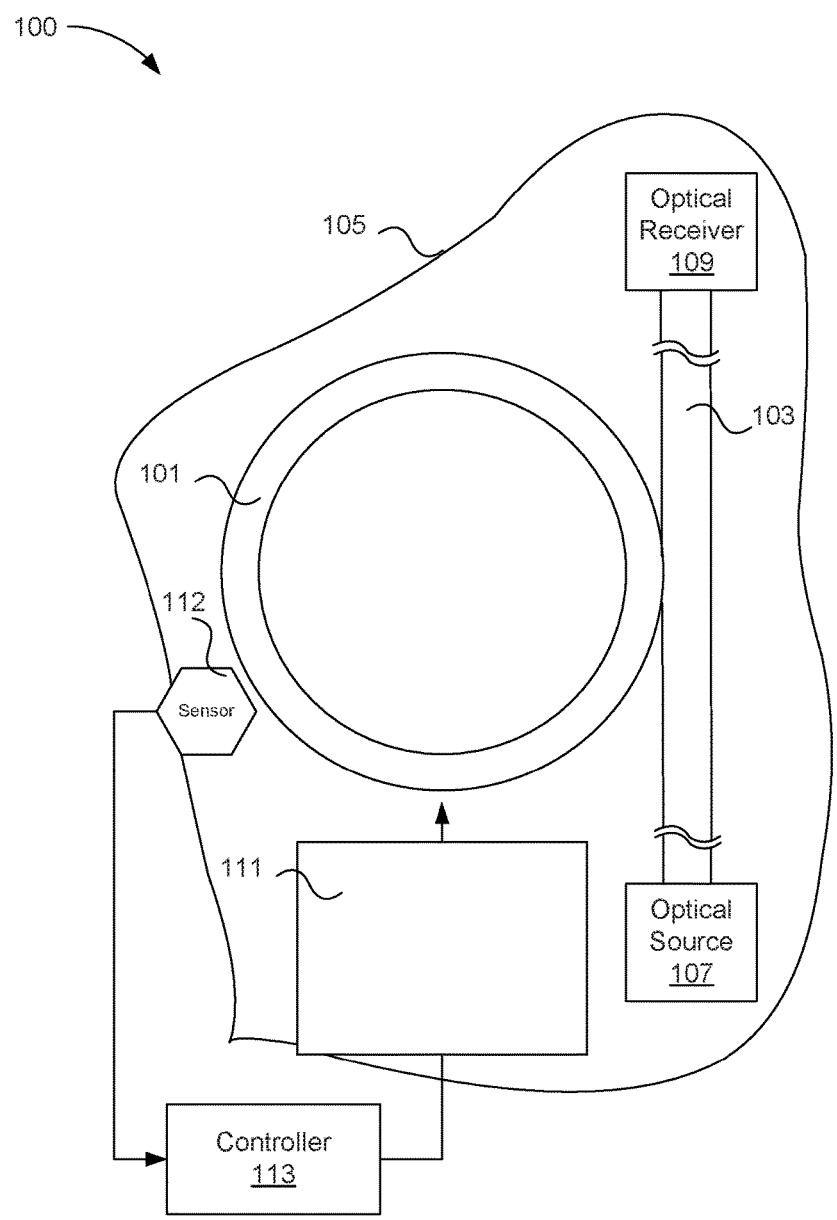
FIG. 1 is a diagram of an illustrative optical ring resonator according to one example of the principles described herein.

Systems making use of optical components often rely upon the precise manipulation of optical energy, such as a beam of light, to accomplish a desired task. This is especially true in systems utilizing light for high-speed, low-energy communication between two nodes. Often optical resonators are used to selectively filter, switch, or modulate light beams.

Ring resonators are a type of optical resonator. Ring resonators have an optical waveguide in a closed loop coupled to a tangential waveguide. Ring resonators also have a characteristic resonant frequency, which can be controlled by selective tuning in some systems.

When light of the appropriate wavelength is introduced into the loop by the tangential waveguide, the light beam builds up in intensity over multiple round-trips through the closed loop due to constructive interference. Alternatively, light of a wavelength apart from the resonant frequency or range of the ring resonators is attenuated by destructive interference in the ring resonator. The resonant optical energy then exits the loop back into the tangential waveguide.

As described above, ring resonators (also known as optical resonators) may be used in many different optical devices. Ring resonators have a resonant ring that is an optical waveguide in a closed loop. The resonant ring is optically coupled to a tangential waveguide. When light of the appropriate wavelength is introduced into the loop from the tangential waveguide, the light beam builds up in intensity over multiple round-trips through the closed loop due to constructive interference. The optical energy then exits the loop back into the tangential waveguide. Ring resonators have a characteristic resonant frequency, which can be selectively tuned in some systems.

The resonant frequency of a ring resonator (or optical waveguide) may be adjusted by changing the effective index of refraction of the optical signal in the ring. Consequently, it may be desirable, therefore, to integrate with the ring resonator a device that changes the effective refractive index uniformly in the ring resonator. With accurate control of such a device that alters the refractive index in a ring resonator, one can precisely and selectively tune the ring resonator to a desired resonant frequency.

To accomplish these and other goals, the present specification discloses a ring resonator apparatus in which a change in the effective index of refraction is realized by inserting a dielectric body into the evanescent field generated by light circulating in the ring. By moving the dielectric body into such an evanescent field, the overlap between the dielectric body and the evanescent field is changed, and thus the index of refraction of light propagating in the ring is also changed and may be precisely controlled. This, in turn, allows precise control of the resonant frequency of the ring resonator apparatus.

Precise control of the resonant frequency needs precise control of the movement of the dielectric body in the evanescent field. The present specification thus further discloses a microelectromechanical system ("MEMS") serving as a cantilever above the ring resonator to tune the gap distance between the MEMS structure and the ring resonator. Coulomb interaction between metal layers at the top of the MEMS structure and the bottom of the ring permit highly precise control over changes in the effective index of refraction and, hence, operation of the ring resonator apparatus.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims when referring to optical waveguides, the term "connected" refers to the physical proximity and orientation of at least two optically conductive objects such that an appreciable optical signal through one of the objects is at least partially received in another of the objects.

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "evanescent field" refers to a field of optical energy that propagates just outside a waveguide along with an optical beam that is propagating in the waveguide.

In one example of the principles disclosed herein, an active-control optical resonator includes an oxide layer; a ring resonator arranged in a loop and positioned on the oxide layer; a tangential optical waveguide optically coupled to the ring resonator; a translatable body configured to selectively move into an evanescent field region of the ring resonator; a first electrode positioned on the translatable body; and a second electrode positioned between the oxide layer and the ring resonator.

In another example, an active-control optical modulator includes an oxide layer; a first optical waveguide arranged in a loop and positioned on the oxide layer; a tangential optical waveguide optically coupled to the first optical waveguide; a translatable body configured to selectively move into an evanescent field region of the first optical waveguide; a first electrode positioned on the translatable body, the first electrode comprising indium tin oxide; and a second electrode positioned between the oxide layer and the first optical waveguide, the first electrode and the second electrode being electrically coupled to a voltage source. The translatable body is capable of moving between a first position and a second position with respect to the first optical waveguide.

A method of modulating optical energy is performed with an optical resonator having: an oxide layer; a first optical waveguide arranged in a loop and positioned on the oxide layer; a tangential optical waveguide optically coupled to the first optical waveguide; a translatable body configured to selectively move into an evanescent field region of the first optical waveguide; a first electrode positioned on the translatable body; and a second electrode positioned between the oxide layer and the ring resonator, the first electrode and the second electrode being electrically coupled to a voltage source. The translatable body is capable of moving between a first position and a second position with respect to the first optical waveguide. The method includes selectively altering a resonant frequency of the optical resonator by selectively positioning the translatable body within an evanescent field region of the optical resonator.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example. The principles disclosed herein will now be discussed with respect to illustrative systems and methods.

Referring now to FIG. 1, a diagram of an illustrative ring or optical resonator (100) is shown. The resonator (100) may have a first optical waveguide arranged in a loop to form a resonator ring (101). A second, tangential optical waveguide (103) may be tangentially connected to the ring resonator (101). In certain examples, this tangential connection may include the overlap of corresponding evanescent field regions of the ring resonator (101) and tangential optical waveguide (103). The overlap of corresponding evanescent field regions may allow optical energy traveling through the tangential optical waveguide (103) to be coupled to and travel through the ring resonator (101), even though the resonator ring (101) and tangential optical waveguide (103) may not be coupled physically.

The ring resonator (101) and tangential optical waveguide (103) may be fabricated out of semiconductor materials, such as silicon, gallium arsenide, germanium, and the like. The ring resonator (101) and tangential optical waveguide (103) may be fabricated on a substrate (105), such as silicon. In some examples, an insulating layer such as silicon dioxide may be fabricated on the substrate (105) and encapsulate the ring resonator (101) and tangential optical waveguide (103).

The ring resonator (101) will have a characteristic resonant frequency, which may be at least partially determined by the cross-sectional dimensions of the ring resonator (101) and tangential optical waveguide (103), the ring dimensions of the ring resonator (101), electrical charges, the material of which the ring resonator (101) and tangential optical waveguide (103) are fabricated, and the operating temperature of the optical resonator (100). The optical resonator (100) may be configured to sustain optical energy having a wavelength that matches the resonant frequency or a range of wavelengths above and below the resonant frequency of the ring resonator (101). All other optical energy may be attenuated or suppressed by destructive interference.

Optical energy may be generated by an optical source (107), such as a laser or a light emitting diode (LED) and enter the resonator (100) through a first end of the tangential waveguide (103). Optical energy having the correct wavelength (i.e., at or near the resonant frequency of the ring resonator (101)) may enter the ring resonator (101) at the tangential optical junction of the ring (101) and the tangential waveguide (103) and resonate through the loop of the ring resonator (101). Optical energy of other wavelengths will be dissipated through destructive interference and the intrinsic losses of the ring (101). The optical signals that are resonant with the ring resonator (101) may then be transmitted through the tangential waveguide (103) to an optical receiver (109) disposed at a second end of the tangential optical waveguide (103), such as a photodiode or another waveguide. Consequently, the optical resonator (100) may be used to modulate the intensity of a particular wavelength of optical energy by moving in and out of resonance with light of a given frequency.

The resonant frequency of the optical resonator (100) may be tuned by altering an effective index of refraction (n) in the material of the ring resonator (101). The effective index of refraction (n) may differ from an actual index of refraction of the material of the ring resonator (101) due to the evanescent field region of the ring resonator (101) in which optical energy may extend beyond the confines of the outer surface of the ring resonator (101). Thus the effective index of refraction (n) of the ring resonator (101) may be a function of the index of refraction of the waveguide material and the index of refraction of the matter (e.g., air) within the evanescent field region of the ring resonator (101).

Consequently, the effective index of refraction (n) of the ring resonator (101) may be altered by introducing a translatable body (111) into the evanescent field region that has a different index of refraction than that of the matter displaced from the evanescent field region by the translatable body (111), e.g., air, thus altering the resonant frequency of the ring resonator (101). The amount of change in the effective index of refraction (n) of the ring resonator (101) may be related to the index of refraction of the translatable body (111) and the degree to which the translatable body (111) is introduced into the evanescent field region.

The translatable body (111) may be introduced into the evanescent field region of the ring resonator (101) using one or more microelectromechanical systems (MEMS). For example, an electrostatic MEMS actuator may be used to selectively move the translatable body (111) in and out of the evanescent field region of the ring resonator (101) as charge is applied to the actuator. In some examples, the translatable body (111) may be a portion of such a MEMS actuator.

In certain examples, the translatable body (111) may have a dielectric constant of at least about 1.3. As metallic materials and other electrical conductors tend to be optically lossy, a translatable body (111) used as a component in an electrostatic MEMS actuator may operate more efficiently with a higher dielectric constant. For example, the translatable body (111) may include a semiconductor material, such as silicon, germanium, and/or the like.

The translatable body (111) may be used to compensate for fluctuations in the resonant frequency of the optical resonator (100) caused by factors such as shifts in operating temperature of the optical resonator (100). The translatable body (111) may be selectively introduced or removed from the evanescent field region of the ring resonator (101) according to the degree to which the resonant frequency of the optical resonator (100) deviates from a desired value. The movement of the translatable body (111) may alter the effective index of refraction (n) of the ring resonator (101), thus compensating the resonant frequency of the optical resonator (100) according to the fluctuation experienced.

A sensor (112) may also be included with the optical resonator (100). The sensor (112) may be configured to detect the resonant frequency of the optical resonator (100) and dynamically provide digital or analog data representative of the resonant frequency to a controller (113).

The sensor (112) may include any suitable sensor according to a specific application of the principles described herein. For example, the sensor (112) may be an optical sensor disposed near or within at least one of the ring resonator (101) and tangential optical waveguide (103) and configured to measure the intensity of different wavelengths of light that are transmitted through the ring resonator (101) and tangential optical waveguide (103) during operations (e.g., diagnostic operations) of the optical resonator (100). By receiving data from the sensor (112), the controller (113) may be configured to compute which wavelength of light is dominant in the optical resonator (100) and thus determine the current resonant frequency of the optical resonator (100).

In other examples, the sensor (112) may include an optical sensor disposed near or within the ring resonator (101) to detect the resonant frequency of the ring resonator (101). In still other examples, the sensor (112) may include an electronic sensor configured to measure the amplitude of voltages produced by a photodiode in the optical receiver (109). By detecting trends in the amplitude of these voltages (e.g., a steadily decreasing or increasing mean voltage), shifts in the resonant frequency of the optical resonator (100) may be detected.

The controller (113) may include one or more processing elements. Exemplary processing elements that may be used in the controller (113) include, but are not limited to, computer processors, microcontrollers, application-specific integrated circuits, field programmable gate arrays and the like. A processing element used in the controller (113) may be configured to execute operations stored in memory in conjunction with data received from the sensor (112) to control the movement of the translatable body (111).

To control the movement of the translatable body (111), the controller (113) may be configured to alter a voltage or current at an output pin to cause the translatable body (111) to selectively approach or retract from the ring resonator (101) according to the desired resonant frequency of the optical resonator (100) and a present measured deviation from the desired resonant frequency. For example, in applications where the translatable body (111) includes a MEMS actuator, the dynamic voltage or current output by the controller (113) to a pin coupled to the MEMS actuator may induce movement in the actuator that selectively translates the translatable body (111). In other examples, the controller (113) may be configured to move the translatable body (111) by selectively controlling an electric motor, solenoid, spring, or any other type of actuator coupled to the translatable body (111) according to a specific application of the principles described herein.

In the present example, the sensor (112), controller (113) and translatable body (111) may be configured in a feedback loop such that data corresponding to changes in the resonant frequency of the optical resonator (100) may be provided by the sensor (112) to the controller (113), which may allow the controller (113) to compute movements by the translatable body (111) to compensate for those changes. The movements by the translatable body (111) may result in changes in the resonant frequency of the optical resonator (100) that may be detected by the sensor (112), and thus the controller (113) may continue selectively translating the translatable body (111) until the optical resonator (100) is operating within a desired precision of a desired resonant frequency.

In other examples, the system described in connection with FIG. 1 may be used to selectively implement different resonant frequencies for the resonator (100) as may be needed over time for different applications. This is different than using the system to maintain a specific resonant frequency which may tend to drift under changing ambient conditions as described immediately above.

Figure 2A:
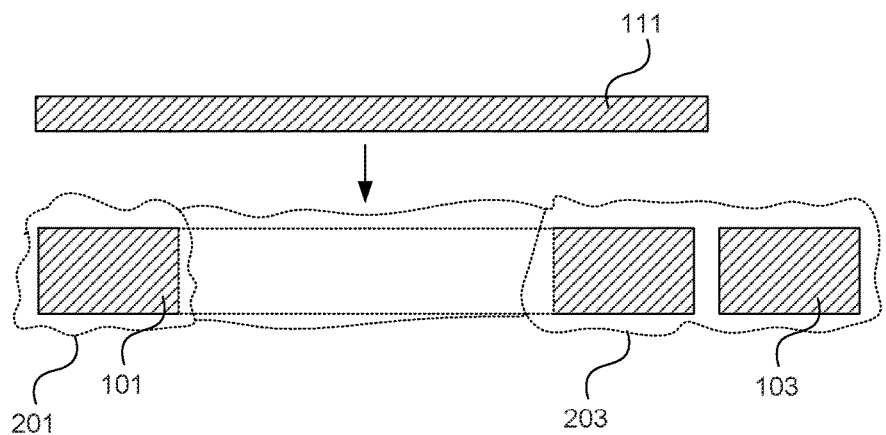
FIGS. 2A-2B are cross-sectional schematics of an illustrative optical ring resonator showing possible positions of an illustrative translatable body according to one example of the principles described herein.
Figure 2B:
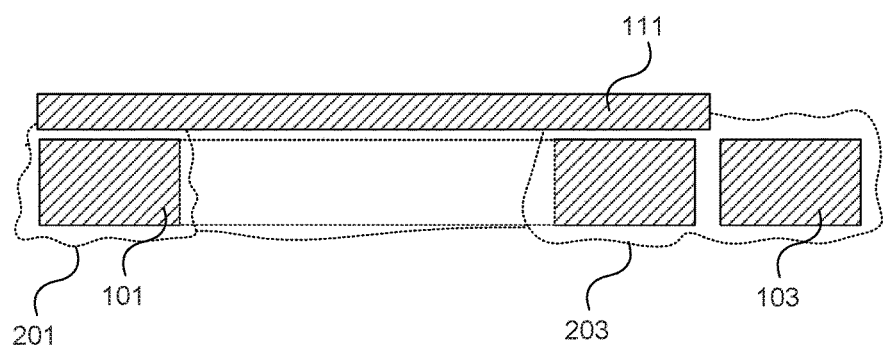

Referring now to FIGS. 2A-2B, cross-sectional views are shown of illustrative ring resonators (101) and tangential optical waveguides (103) in an optical resonator (100, FIG. 1) together with an illustrative translatable body (111). The ring resonator (101) and tangential optical waveguide (103) are configured to substantially confine and manipulate optical energy transmitted there through. However, due to the fact that optical energy cannot be completely discontinuous at a boundary, the optical energy transmitted through the ring resonator (101) and tangential optical waveguide (103) may not be confined to the area within the outer periphery of the ring resonator (101) and tangential optical waveguide (103). Hence, evanescent field regions (201, 203) of optical energy may substantially surround the ring resonator (101) and tangential optical waveguide (103) when optical energy is being transmitted through the components.

The evanescent field regions (201, 203) may enable the coupling of optical energy between the ring resonator (101) and tangential optical waveguide (103). For example, the evanescent field regions in the ring resonator (101) and tangential optical waveguide (103) may overlap at the point where the tangential optical waveguide (103) passes closest to the ring resonator (101), thereby creating a merged evanescent field region (203). This merged evanescent field region (203) may allow the optical energy transmitted through the tangential optical waveguide (103) to be received into the loop of the ring resonator (101) and thus undergo wavelength-based filtering from the resonant effects of the ring resonator (101).

These evanescent field regions (201, 203) may also allow the selective positioning of the translatable body (111) to alter the resonant frequency of the optical resonator (100, FIG. 1). As explained above, the resonant frequency of the optical resonator (100, FIG. 1) may be a function of, among other factors, the effective refractive index (n) of the material occupying the evanescent field regions (201, 203) of the ring resonator (101) and tangential optical waveguide (103).

More precisely, where E(r) denotes the electric field distribution of the unperturbed ring resonator optical mode, normalized in a way that $\int \varepsilon(r)|E(r)|^2=1$ where $\varepsilon(r)$ is the dielectric profile of the unperturbed ring, then the resonance shift occurring upon a change $\Delta\varepsilon(r)$ of the dielectric environment of the ring is given by $\int \Delta\varepsilon(r)|E(r)|^2$.

FIG. 2A shows the translatable body (111) completely outside of the evanescent field regions (201, 203) of the ring resonator (101) and tangential optical waveguide (103). In this position, the effective refractive index of the ring resonator (101) and tangential optical waveguide (103), and by extension the resonant frequency of the optical resonator (100, FIG. 1), may not be substantially affected by the position of the translatable body (111).

FIG. 2B shows the translatable body (111) positioned within the evanescent field regions (201, 203). In this configuration, the translatable body (111) may alter the effective refractive index (n) of at least the ring resonator (101) and thus alter the resonant frequency of the system (100, FIG. 1). The degree to which the resonant frequency of the optical resonator (100, FIG. 1) is altered by the translatable body (111) may be controlled by selectively adjusting the amount of evanescent field regions (201, 203) that are occupied by the translatable body (111).

In the present example, the translatable body (111) is shown being introduced to the evanescent field regions (201, 203) of the ring resonator (101) and tangential optical waveguide (103) through controlled vertical movement of the translatable body (111). It will be understood, however, that the translatable body (111) may be configured to move along any axis or combination of axes in linear or nonlinear translation to accomplish the desired tuning, as may suit a particular application of the principles herein.

Moreover, the translatable body (111) may be selectively introduced to any portion or combination of portions of the evanescent field regions (201, 203) to accomplish the desired tuning, as may suit a particular application of the principles herein. Additionally, there may be multiple translatable bodies that are used to selectively encroach on the evanescent field regions (201, 203).

Figure 3:
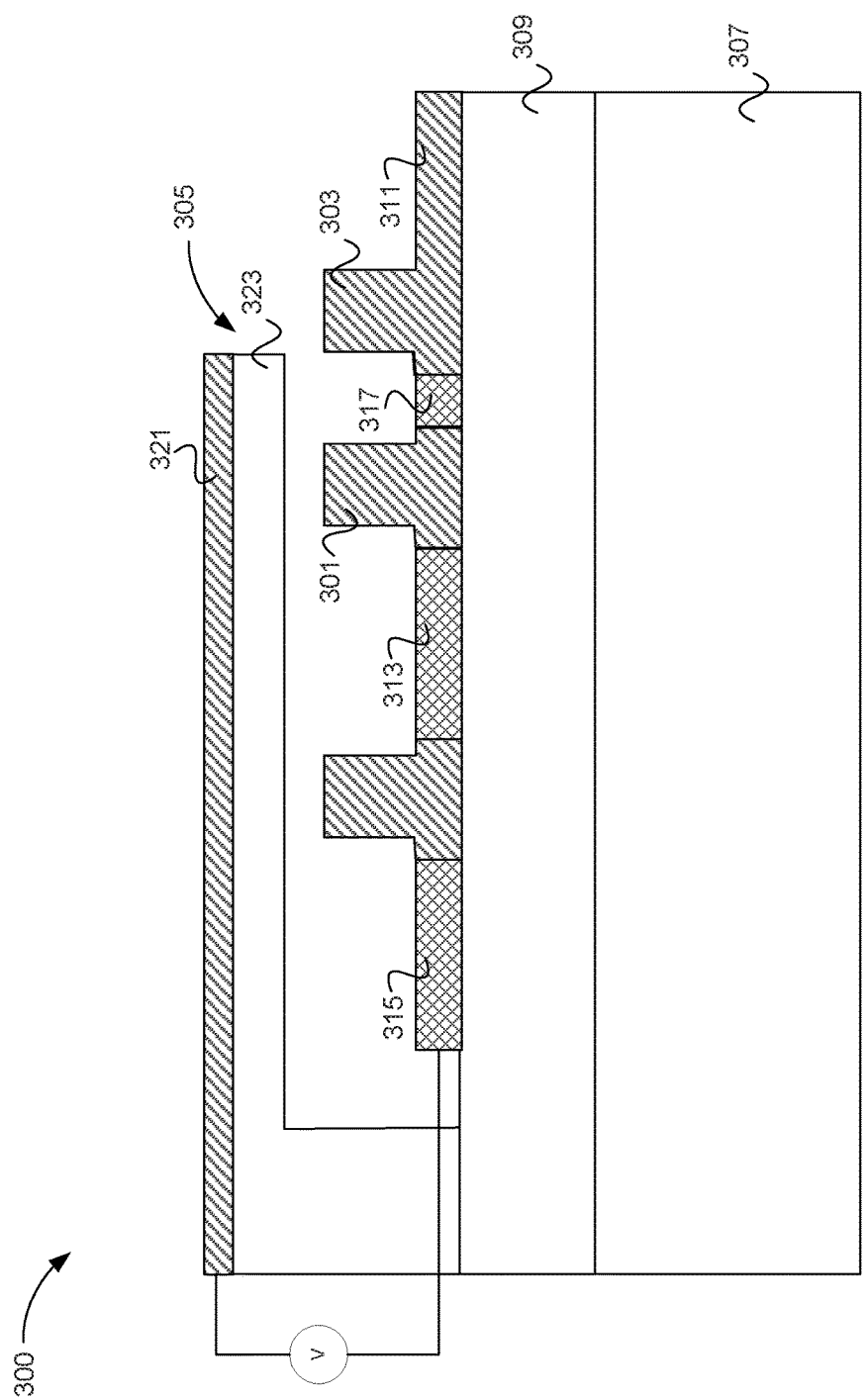
FIG. 3 is a diagram of an illustrative optical ring resonator having a fix-free cantilever according to one example of the principles described herein.

Referring now to FIG. 3, a cross-sectional view of an illustrative optical resonator (300) is shown. The optical resonator (300) may include a first optical waveguide or ring resonator (301) formed into a loop and a second optical tangential waveguide (303) tangentially coupled to the ring resonator (301). A translatable body (305) may be used to selectively tune the resonant frequency of the optical resonator (300) according to the principles described above. In the present example, the translatable body (305) is an electrostatic MEMS actuator in the form of a fixed-free cantilever (one end of the cantilever is fixed, while the other end is free) that may be selectively introduced into the evanescent field region of the ring resonator (301) and tangential optical waveguide (303) by applying the correct polarity of charge to a metal contact (321) disposed on the translatable body (305).

The optical resonator system (300) may be fabricated on a semiconductor substrate (307) (e.g., a silicon wafer). A first oxide layer (309) may be disposed on the semiconductor substrate (307) to electrically and optically isolate the semiconductor substrate (307) from the translatable body (305) and the ring resonator (301) and tangential optical waveguide (303). The ring resonator (301) and tangential optical waveguide (303) may be formed on a second layer of semiconductor material (311) disposed on the first oxide layer (309). Portions (313, 315, 317) of the second layer of semiconducting material (311) may be doped to selectively inject and remove charge from the ring resonator (301) in order to modulate data optically to the optical energy transmitted through the ring resonator (301) and tangential optical waveguide (303). The semiconducting material may be sufficiently doped to provide a conductive surface to form a capacitor plate with the top cantilever metallic surface. This enables individual active control and allows arrayed devices which can be scaled.

In one example, the optical resonator system (300) includes a substrate (307) comprising silicon (Si). The layer of oxide (309) disposed on the substrate (307) may be comprised of silicon dioxide ($SiO_2$). The translatable body or cantilever (305) is comprised of a silicon nitride (SiNx) layer (323). The metal contact (321) disposed on the translatable body or cantilever (305) is, in one example, comprised of indium tin oxide (ITO). A low-loss conductive layer, for example a doped layer or metal contact, such as ITO, provides the lower contact. In one example, doping regions (313, 315, 317) provide the lower contact. The doping regions can be either P or N doped. In one example, a doping concentration of around 2E15/(cm**3) is sufficient to create a contact conductive surface, though different doping concentrations are contemplated for different configurations or applications. In one example, a voltage (indicated schematically) is applied across the upper metal contact (321) and one or more of the doping regions (313, 315, 317) using conventional techniques.

Figure 4A:
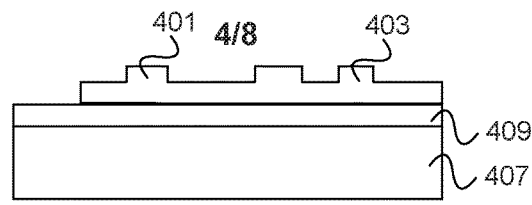
FIGS. 4A-4E are cross sectional schematics illustrating fabrication of an optical ring resonator according to one example of the principles described herein.
Figure 4B:
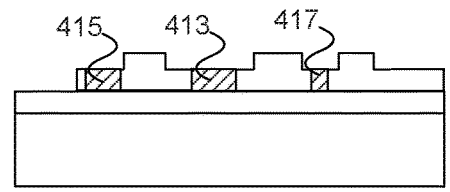
Figure 4C:
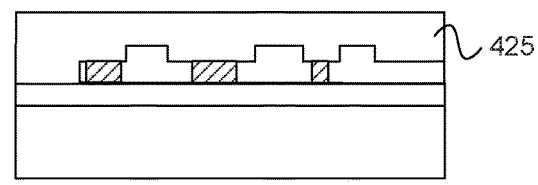
Figure 4D:
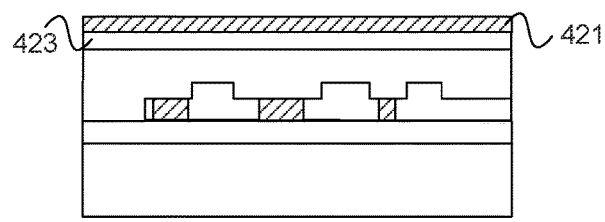
Figure 4E:
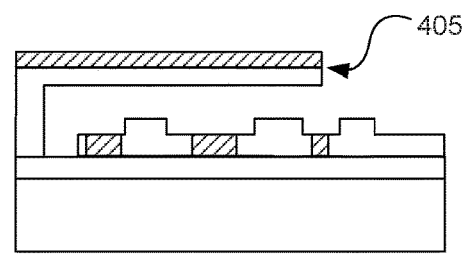

Referring to FIGS. 4A-4E, the steps for fabrication of one example of the principles disclosed herein are shown. The steps include: (a) preparing the substrate (407) and layer of oxide (409) disposed thereon and forming the ring resonator (401) and tangential optical waveguide (403) on the oxide layer using a semiconductor material (FIG. 4A), (b) doping one or more regions (413, 415, 417) of the semiconductor material through ion implantation (FIG. 4B), (c) depositing a sacrificial amorphous silicon (a-Si) film (425) over the semiconductor material (FIG. 4O), (d) depositing a SiNx film (423) over the a-Si film and then depositing an ITO film (421) over the SiNx film for the top contact (FIG. 4D) and (e) patterning the ITO film, etching the SiNx and removing the sacrificial a-Si layer to fabricate the cantilever (405) (FIG. 4E). In one example, the optical resonator device produced according to the fabrication steps provides a device measuring about 5 to about 10 microns in diameter with a SiNx cantilever about 125 nm thick and with a distance between the lower surface of the cantilever and the upper surface of the bottom electrode of about 300 nm.

Figure 5:
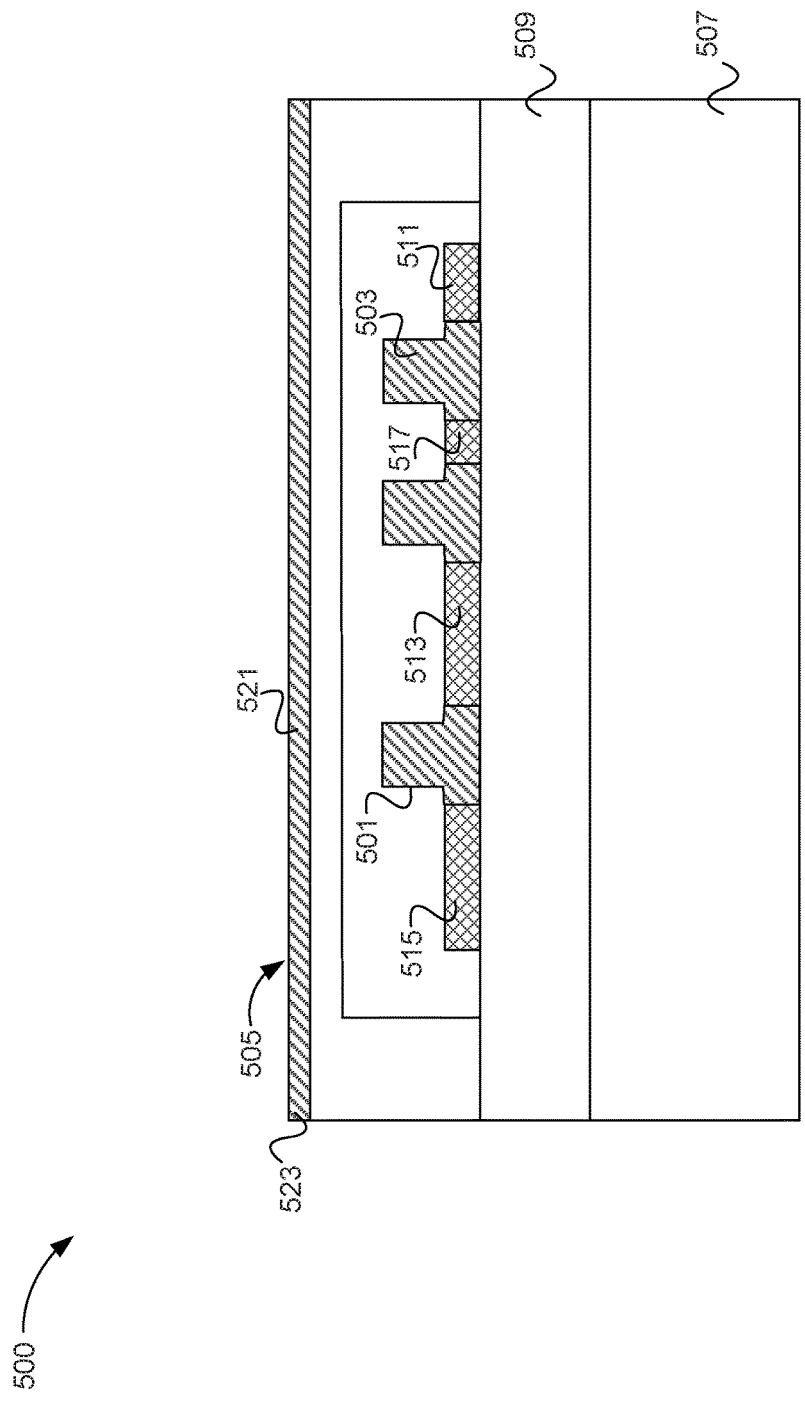
FIG. 5 is a diagram of an illustrative ring resonator having a fix-fix cantilever according to one example of the principles described herein.

Referring now to FIG. 5, a cross-sectional view of an alternative illustrative optical resonator (500) is shown. The optical resonator (500) may include a first optical waveguide or ring resonator (501) formed into a loop and a second optical tangential waveguide (503) tangentially coupled to the ring resonator (501). A translatable body (505) may be used to selectively tune the resonant frequency of the optical resonator (500) according to the principles described above. In one example, the translatable body (505) is an electrostatic MEMS actuator in the form of a fixed-fixed cantilever (both ends of the cantilever are fixed) that may be selectively introduced into the evanescent field region of the ring resonator (501) and tangential optical waveguide (503) by applying the correct polarity of charge to a metal contact (521) disposed on the translatable body (505).

The optical resonator system (500) may be fabricated on a semiconductor substrate (507) (e.g., a silicon wafer). A first oxide layer (509) may be disposed on the semiconductor substrate (507) to electrically and optically isolate the semiconductor substrate (507) from the translatable body (505) and the ring resonator (501) and tangential optical waveguide (503). The ring resonator (501) and tangential optical waveguide (503) may be formed on a second layer of semiconductor material (511) disposed on the first oxide layer (609). Portions (513, 515, 517) of the second layer of semiconducting material (511) may be doped to selectively inject and remove charge from the ring resonator (501) in order to modulate data optically to the optical energy transmitted through the ring resonator (501) and tangential optical waveguide (503). The semiconducting material may be sufficiently doped to provide a conductive surface to form a capacitor plate with the top cantilever metallic surface. This enables individual active control and allows arrayed devices which can be scaled.

In one example, the optical resonator system (500) includes a substrate (507) comprising silicon (Si). The layer of oxide (509) disposed on the substrate (507) may be comprised of silicon dioxide ($SiO_2$). The translatable body or cantilever (505) is comprised of silicon nitride (SiNx) layer (523). The metal contact (521) disposed on the translatable body or cantilever (505) is comprised of indium tin oxide (ITO). A low-loss conductive layer, for example a doped layer or metal contact, such as ITO, provides the lower contact. In one example, doping regions (513, 515, 517) provide the lower contact. The doping regions can be either P or N doped. In one example, a doping concentration of around $2E15/(cm**3)$ is sufficient to create a contact conductive surface, though different doping concentrations are contemplated for different configurations or applications. A voltage is applied across the upper metal contact (521) and one or more of the doping regions (513, 515, 517) using conventional techniques. Fabrication of the fixed-fixed cantilever device follows the same basic steps outlined above for the fixed-free cantilever device.

Figure 6A:
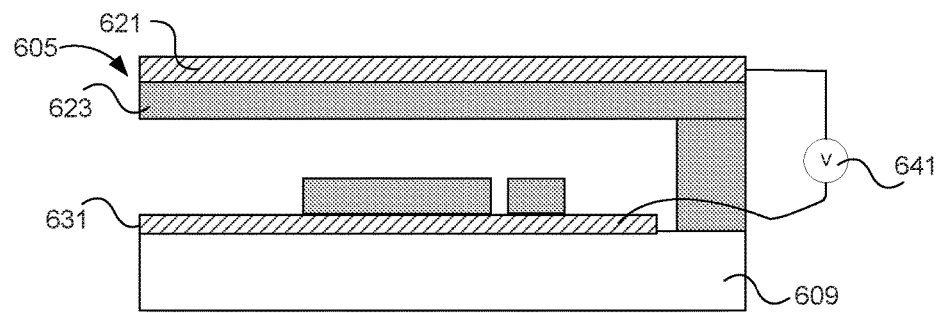
FIGS. 6A-6B are cross-sectional schematics of an illustrative optical ring resonator showing possible positions of an illustrative fix-free cantilever according to one example of the principles described herein.
Figure 6B:
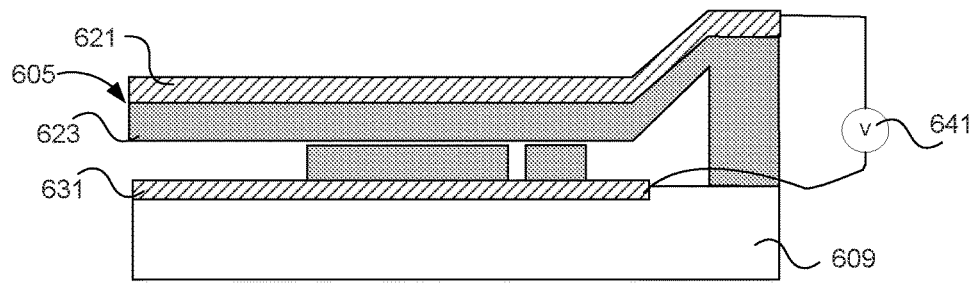

Referring to FIGS. 6A and 6B, an example of operation of an optical resonator according to the principles disclosed herein is illustrated. FIGS. 6A and 6B show a schematic diagram of optical resonator (600) having a fix-free cantilever (605). The cantilever (605) includes a top electrode (621) deposited on a SiNx layer (623). A ring resonator (601) and tangential optical waveguide (603) are positioned below the cantilever (605). A bottom electrode (631) is a low-loss conductive layer positioned on top of an oxide later (609). The low-loss bottom electrode layer can, in certain examples, comprise a metal layer, such as indium tin oxide or one or more doped region as described above.

An "ON" or "OFF" voltage potential, V (641), is applied across the top electrode (621) and the bottom electrode (631). In FIG. 6A, the voltage potential (641) is $V_1$, indicating the OFF state of the device, where the cantilever (605) is in a first position with respect to the ring resonator (601) and the tangential optical waveguide (603). The OFF state provides a specific resonant frequency of electromagnetic radiation in the optical resonator (600), depending on the effective index of refraction (n) resulting from the orientation of the cantilever (605) in the first position. In FIG. 6B, the voltage potential (641) is $V_2$, indicating the ON state of the device, where the cantilever (605) is pulled to a second position with respect to the ring resonator (601) and the tangential optical waveguide (603). The ON state provides a second specific resonant frequency of electromagnetic radiation in the optical resonator (600), depending on the effective index of refraction (n) resulting from the orientation of the cantilever (605) in the second position. The applied voltage need not be merely the two-state ON or OFF described above, but, in some examples, may have several states, each state corresponding to a position of deflection of the cantilever and, hence, resonant frequency in the ring resonator.

Figure 7A:
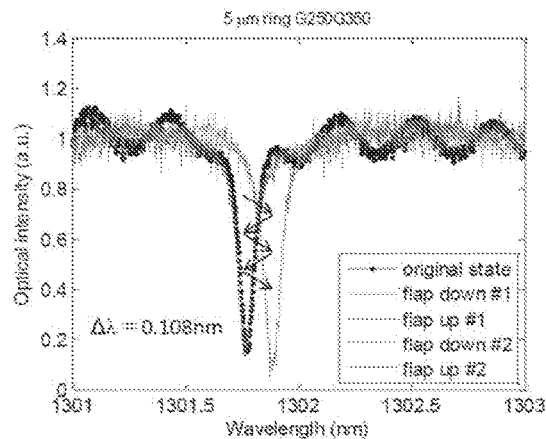
FIGS. 7A-7C are graphs illustrating preliminary data generated using example optical ring resonators based on the principles described herein.
Figure 7B:
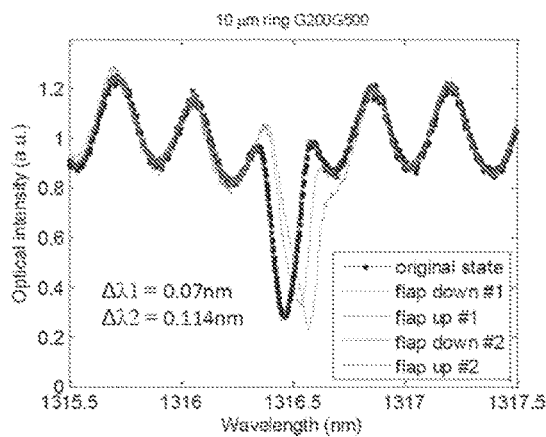
Figure 7C:
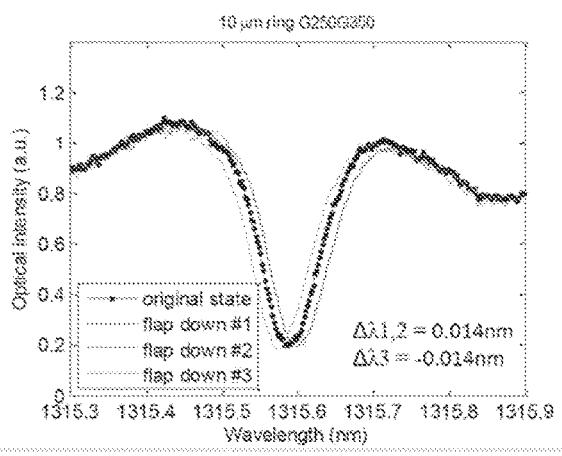

Referring now to FIGS. 7A-7C, graphs illustrating preliminary data generated using optical resonators based on the principles described in this disclosure are provided. In FIG. 7A, the optical intensity of a 5 micron ring subject to up and down deflections indicates a shift of resonant frequency $\Delta\lambda=0.108$ nm. As indicated, the cantilever deflects from an original state to a flap down state, producing the resonant frequency shift in the output. The cantilever then returns to the original state (or flap up state) and repeats, producing the same shift of resonant frequency $\Delta\lambda=0.108$ nm. In FIG. 7B, the optical intensity of a 10 micron ring is subject to two cantilever deflections, the first producing a shift of resonant frequency $\Delta\lambda=0.07$ nm and the second producing a shift of resonant frequency $\Delta\lambda=0.114$ nm from the original state. Similarly, in FIG. 7C, the optical intensity of a 10 micron ring is subject to two cantilever deflections, the first producing a positive shift of resonant frequency $\Delta\lambda1,2=0.014$ nm and the second producing a negative shift of resonant frequency $\Delta\lambda3=0.014$ nm from the original state.

FIG. 8 is a flowchart of a method of operating an active-control optical resonator according to principles described herein. As illustrated in FIG. 8, a method of modulating optical energy is performed with an optical resonator having: an oxide layer; a first optical waveguide arranged in a loop and positioned on the oxide layer; a tangential optical waveguide optically coupled to the first optical waveguide; a translatable body configured to selectively move into an evanescent field region of the first optical waveguide; a first electrode positioned on the translatable body; and a second electrode positioned between the oxide layer and the ring resonator, the first electrode and the second electrode being electrically coupled to a voltage source. The translatable body is capable of moving between a first position and a second position with respect to the first optical waveguide. The method (800) includes selectively altering (801) a resonant frequency of the optical resonator by selectively positioning the translatable body within an evanescent field region of the optical resonator. The translatable body may be a cantilever having at least one end connected to the oxide layer with some portion free to translate.

The preceding description has been presented only to illustrate and describe examples of the principles described. This description is not intended to be exhaustive or to limit these principles to any precise form disclosed. Many modifications and variations are possible in light of the above teaching.

What is claimed is:

1. An active-control optical resonator, comprising:
an oxide layer;
a ring resonator arranged in a loop and positioned on the oxide layer;
a tangential optical waveguide optically coupled to the ring resonator;
a translatable body configured to selectively move into an evanescent field region of the ring resonator, the translatable body including a silicon nitride (SiNx) layer that extends over the ring resonator from a first end of the translatable body to terminate in a second end thereof, and a first electrode deposited on the SiNx layer and extending along the SiNx layer from the first end to the second end of the SiNx layer; and a second electrode positioned between the oxide layer and the ring resonator, wherein the SiNx layer is positioned between the first electrode and the second electrode.

2. The optical resonator of claim 1, wherein the translatable body is a cantilever having the first end connected to the oxide layer by a support of the SiNx layer and the second end free to translate with respect to the ring resonator.

3. The optical resonator of claim 1, wherein the translatable body is a cantilever having the first end connected to the oxide layer by a support of the SiNx layer and the second end connected to the oxide layer by another support of the SiNx layer.

4. The optical resonator of claim 1, wherein the second electrode is a low-loss conductive doped region positioned on the oxide layer by ion implantation or metal deposition.

5. The optical resonator of claim 1, wherein the diameter of the ring resonator is between about 5 microns and about 10 microns.

6. An active-control optical modulator, comprising:
an oxide layer;
a first optical waveguide arranged in a loop and positioned on the oxide layer;
a tangential optical waveguide optically coupled to the first optical waveguide;
a translatable body configured to selectively move into an evanescent field region of the first optical waveguide, the translatable body including a silicon nitride (SiNx) layer that extends over the ring resonator from a first end of the translatable body to terminate in a second end thereof, and a first electrode deposited on the SiNx layer and extending along the SiNx layer from the first end to the second end of the SiNx layer, wherein the first electrode comprising indium tin oxide; and
a second electrode positioned between the oxide layer and the first optical waveguide, the first electrode and the second electrode being electrically coupled to a voltage source, wherein the SiNx layer is positioned between the first electrode and the second electrode;
wherein the translatable body is capable of moving between a first position and a second position with respect to the first optical waveguide.

7. The optical modulator of claim 6, wherein the translatable body is a cantilever having the first end connected to the oxide layer by a support of the SiNx layer and the second end free to translate.

8. The optical modulator of claim 6, wherein the translatable body is a cantilever having the first end connected to the oxide layer by a support of the SiNx layer and the second end connected to the oxide layer by another support of the SiNx layer.

9. The optical modulator of claim 6, wherein the second electrode is a low-loss conductive doped region, positioned on the oxide layer by ion implantation.

10. The optical modulator of claim 6, wherein the diameter of the first optical waveguide is between about 5 microns and about 10 microns.

11. A method of modulating optical energy with an optical resonator having:
an oxide layer;
a first optical waveguide arranged in a loop and positioned on the oxide layer;
a tangential optical waveguide optically coupled to the first optical waveguide;
a translatable body configured to selectively move into an evanescent field region of the first optical waveguide, the translatable body including a silicon nitride (SiNx) layer that extends over the ring resonator from a first end of the translatable body to terminate in a second end thereof, and a first electrode deposited on the SiNx layer and extending along the SiNx layer from the first end to the second end of the SiNx layer; and
a second electrode positioned between the oxide layer and the ring resonator, the first electrode and the second electrode being electrically coupled to a voltage source, wherein the translatable body is capable of moving between a first position and a second position with respect to the first optical waveguide, wherein the SiNx layer is positioned between the first electrode and the second electrode;
the method comprising selectively altering a resonant frequency of the optical resonator by selectively positioning the translatable body within an evanescent field region of the optical resonator.

12. The method of claim 11, wherein the translatable body is a cantilever having the first end connected to the oxide layer by a support of the SiNx layer and the second end free to translate with respect to the first optical waveguide.

13. The method of claim 11, wherein the translatable body is a cantilever having the first end connected to the oxide layer by a support of the SiNx layer and the second end connected to the oxide layer by another support of the SiNx layer.

14. The method of claim 11, wherein the second electrode is a low-loss conductive doped region, positioned on the oxide layer by ion implantation.

15. The method of claim 11, wherein the diameter of the ring resonator is between about 5 microns and about 10 microns.

16. The optical resonator of claim 1, further comprising a sensor to detect a resonant frequency of the ring resonator and dynamically provide data representative of the detected resonant frequency.

17. The optical resonator of claim 16, further comprising a feedback loop comprising the sensor and a controller with control of movement of the translatable body, such that the controller, with the data from the sensor, controls the translatable body to maintain a desired resonant frequency in the ring resonator.

18. The optical resonator of claim 16, wherein the sensor comprises an optical sensor.

19. The optical resonator of claim 16, wherein the sensor comprises an electronic sensor to measure an amplitude of a voltage produced by an optical receiver that is optically coupled to the tangential optical waveguide.

* * * * *